(12) United States Patent
Kim (10) Patent No.: US 8,931,021 B2
(45) Date of Patent: Jan. 6, 2015

(54) DISPLAY APPARATUS AND IMAGE PLAYING METHOD THEREOF

(75) Inventor: Deok-ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 12/791,934

(22) Filed: Jun. 2, 2010

(65) Prior Publication Data

US 2011/0093912 A1    Apr. 21, 2011

(30) Foreign Application Priority Data

Oct. 16, 2009    (KR) ........................ 10-2009-0098712

(51) Int. Cl.
| | |
|---|---|
| *H04N 7/173* | (2011.01) |
| *H04N 21/4147* | (2011.01) |
| *H04N 21/462* | (2011.01) |
| *H04N 21/4402* | (2011.01) |
| *H04N 7/01* | (2006.01) |
| *H04N 21/44* | (2011.01) |

(52) U.S. Cl.
CPC ..... *H04N 21/44004* (2013.01); *H04N 21/4147* (2013.01); *H04N 21/4622* (2013.01); *H04N 21/440281* (2013.01); *H04N 7/014* (2013.01); *H04N 21/440218* (2013.01)
USPC ................ 725/94; 725/38; 725/87; 725/89; 725/90; 725/93; 370/468

(58) Field of Classification Search
CPC .......... H04N 21/2401; H04N 21/4104; H04N 21/4135; H04N 21/4147; H04N 21/44004
See application file for complete search history.

(56) References Cited

U.S. PATENT DOCUMENTS

| | | | | |
|---|---|---|---|---|
| 6,115,337 | A | * | 9/2000 | Takagi et al. ............... 369/47.33 |
| 2004/0073943 | A1 | | 4/2004 | Poslinski et al. |
| 2004/0126090 | A1 | | 7/2004 | Naitoh |
| 2004/0131335 | A1 | * | 7/2004 | Halgas et al. ................... 386/83 |
| 2004/0179825 | A1 | | 9/2004 | Im |
| 2005/0081143 | A1 | * | 4/2005 | Liang ............................ 715/513 |
| 2006/0146780 | A1 | * | 7/2006 | Paves ............................ 370/348 |
| 2007/0266398 | A1 | * | 11/2007 | Vandaele ......................... 725/38 |
| 2008/0267213 | A1 | * | 10/2008 | Deshpande ................... 370/468 |

FOREIGN PATENT DOCUMENTS

| | | |
|---|---|---|
| EP | 1 995 732 A1 | 11/2008 |
| WO | 2006/082562 A1 | 8/2006 |

OTHER PUBLICATIONS

Extended Search Report dated Oct. 12, 2010 issued in counterpart European Application No. 10166994.3.
Communication issued Dec. 2, 2011, in corresponding European Application No. 10 166 994.3.

* cited by examiner

*Primary Examiner* — Joshua Taylor
(74) *Attorney, Agent, or Firm* — Sughrue Mion, PLLC (57) ABSTRACT

A display apparatus and image playing method thereof, are provided. The display apparatus includes a broadcasting receiver which receives a broadcasting signal; a communication unit which communicates with an external device comprising a storage medium; a first buffer which buffers the broadcasting signal to store the received broadcasting signal in the storage medium; a second buffer which buffers a broadcasting signal input from the external device to play the broadcasting signal stored in the storage medium; and a controller which outputs a control signal to the external device to control a broadcasting signal reception volume received from the external device based on at least one buffer volume of the first buffer and the second buffer upon execution of a broadcasting recording and playing function which stores the broadcasting signal in the storage medium and plays the stored broadcasting signal.

26 Claims, 6 Drawing Sheets

FIRST BUFFER

SECOND BUFFER

US 8,931,021 B2

DISPLAY APPARATUS AND IMAGE PLAYING METHOD THEREOF

CROSS-REFERENCE TO RELATED APPLICATION

This application claims priority from Korean Patent Application No. 10-2009-0098712, filed on Oct. 16, 2009, in the Korean Intellectual Property Office, the disclosure of which is incorporated herein by reference.

BACKGROUND

1. Field

Apparatuses and methods consistent with the exemplary embodiments relate to a display apparatus and an image playing method thereof, and more particularly, to a display apparatus and an image playing method thereof which stores an image through a network.

2. Description of the Related Art

As a personal video recording and playing device, a personal video recorder (PVR) generally includes a data storage unit storing data in a large capacity (for example, a hard disk) to thereby extract and play data from the data storage unit. While a videocassette recorder (VCR) stores an analog signal in a cassette tape, the PVR converts a broadcasting signal into digital information in real time and stores the compressed digital data in an internal hard disk in an MPEG-2 format. If a broadcasting signal is an analog signal, it is encoded into a digital signal and stored as a digital signal. If a broadcasting signal is a digital signal, it is stored as a digital signal. To play a video which is recorded in the PVR, the data which are stored in the hard disk and other storage units are decoded and played in real time.

As a network function is added to the PVR, a broadcasting signal may be stored in, and played from, an external storage unit.

SUMMARY

Accordingly, it is an aspect of the exemplary embodiments to provide a display apparatus and an image playing method thereof which plays an image while maintaining a recording quality.

Also, it is another aspect of the exemplary embodiments to provide a display apparatus and an image playing method thereof which determines a data transmission volume by detecting a buffer volume of a buffer.

Additional aspects of the exemplary embodiments will be set forth in part in the description which follows and, in part, will be obvious from the description, or may be learned by practice of the exemplary embodiments.

The foregoing and/or other aspects of the exemplary embodiments are also achieved by providing a display apparatus, including: a broadcasting receiver which receives a broadcasting signal; a communication unit which communicates with an external device comprising a storage medium; a first buffer which buffers the broadcasting signal to store the received broadcasting signal in the storage medium; a second buffer which buffers a broadcasting signal input from the external device to play the broadcasting signal stored in the storage medium; and a controller which outputs a control signal to the external device to control the reception volume of a broadcasting signal received from the external device based on at least one buffer volume of the first buffer and the second buffer upon execution of a broadcasting recording and playing function which stores the broadcasting signal in the storage medium and plays the stored broadcasting signal.

The controller may output a control signal to the external device to make the broadcasting signal transmission volume transmitted to the external device consistent with a preset transmission volume.

The controller may determine the broadcasting signal transmission volume based on a bit rate of the received broadcasting signal and a buffer volume of the first buffer.

The controller may output a control signal to the external device to control the broadcasting signal reception volume in inverse proportion to the buffer volume of the first buffer.

The controller may output a control signal to the external device to control the broadcasting signal reception volume in proportion to a buffer volume of the second buffer.

The controller may output a control signal to the external device to adjust the number of I frames of the broadcasting signal received per second from the external device.

The controller may output a control signal to the external device to reduce the number of I frames of the broadcasting signal received per second from the external device if the broadcasting signal is played at a faster speed.

The display apparatus may further include a signal processor which plays a broadcasting signal received from the external device, wherein the controller may control the signal processor to repeatedly play the received I frames if the number of I frames received per second is less than the preset number.

The display apparatus may further include a signal converter which converts at least one of a resolution and a compression rate of an image signal, wherein the controller may control the signal converter to decrease a resolution or increase a compression rate of a broadcasting signal received from the broadcasting receiver if the buffer volume of the first buffer exceeds a predetermined value, and the broadcasting signal whose resolution decreases or compression rate increases is buffered by the first buffer.

The broadcasting signal may be changed from a high definition (HD) signal into a standard definition (SD) signal.

If the broadcasting signal is an MPEG 2 format, the compression rate of the broadcasting signal may be changed according to an MPEG 4 format.

Another aspect of the exemplary embodiments may be achieved by providing an image playing method of a display apparatus which communicates with an external device including a storage medium, the method including: receiving a selection signal to select a broadcasting recording and playing function which stores a received broadcasting signal in the storage medium and plays the stored broadcasting signal; buffering the broadcasting signal by the first buffer to store the broadcasting signal in the storage medium; buffering a broadcasting signal input from the external device by a second buffer to play the broadcasting signal stored in the storage medium; and outputting a control signal to the external device to control a broadcasting signal reception volume received from the external device based on at least one buffer volume of the first buffer and the second buffer.

The outputting the control signal to the external device may include outputting a control signal to control the reception volume of the broadcasting signal to make the broadcasting signal transmission volume transmitted to the external device consistent with a preset transmission volume.

The method may further include determining the broadcasting signal transmission volume based on a bit rate of a received broadcasting signal and a buffer volume of the first buffer.

The outputting the control signal to the external device may include outputting a control signal to reduce the broadcasting signal reception volume if the buffer volume of the first buffer increases.

The outputting the control signal to the external device may include outputting a control signal to reduce the broadcasting signal reception volume if the buffer volume of the second buffer decreases.

The outputting the control signal to the external device may include outputting a control signal to adjust the number of I frames of the broadcasting signal received from the external device.

If the broadcasting signal is played at a faster speed, the number of I frames of the broadcasting signal received from the external device may decrease.

The method may further include playing a broadcasting signal received from the external device, wherein the playing the broadcasting signal comprises playing the received I frame repeatedly if the number of I frames of the broadcasting signal received per second from the external device is less than the preset number.

The method may further include decreasing a resolution or increasing a compression rate of a broadcasting signal received from the broadcasting receiver if the buffer volume of the first buffer exceeds a predetermined value.

The broadcasting signal may be changed from an HD signal into an SD signal.

If the broadcasting signal is a broadcasting signal in an MPEG 2 format, the compression rate of the broadcasting signal may be changed according to an MPEG 4 format.

BRIEF DESCRIPTION OF THE DRAWINGS

The above and/or other aspects of the exemplary embodiments will become apparent and more readily appreciated from the following description of the embodiments, taken in conjunction with the accompanying drawings of which.

DETAILED DESCRIPTION OF EXEMPLARY EMBODIMENTS

Hereinafter, exemplary embodiments will be described with reference to accompanying drawings, wherein like numerals refer to like elements and repetitive descriptions will be avoided as necessary. Expressions such as "at least one of," when preceding a list of elements, modify the entire list of elements and do not modify the individual elements of the list.

Figure 1:
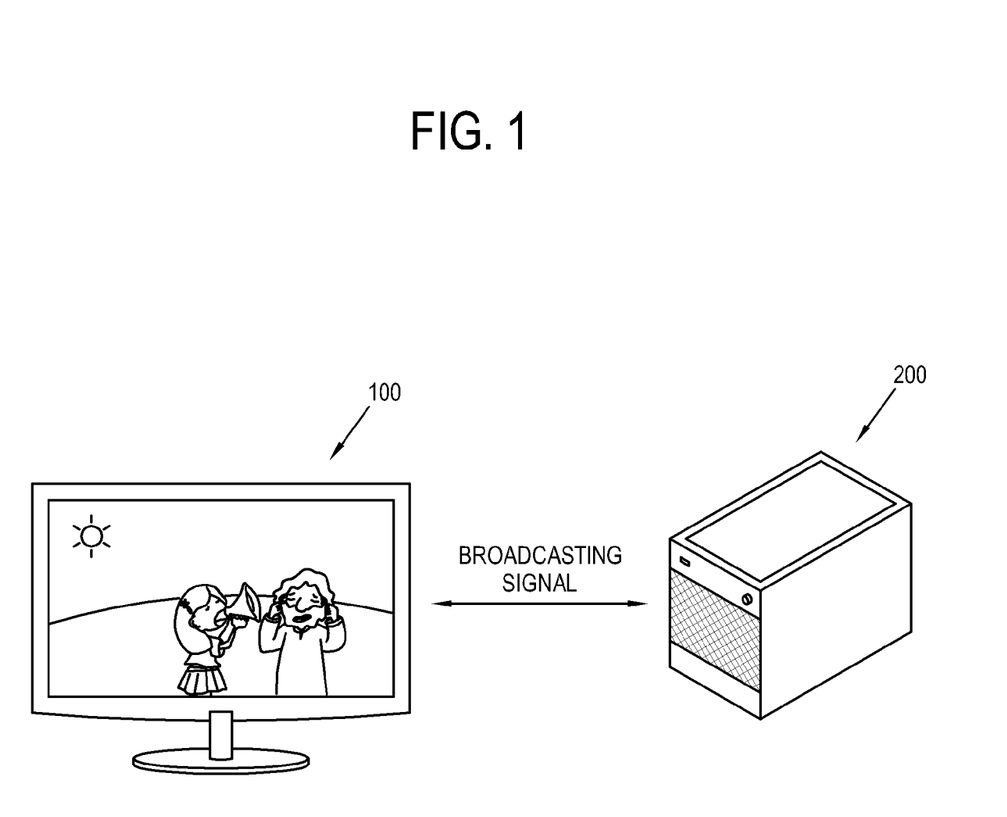
FIG. 1 illustrates a display apparatus and an external device according to an exemplary embodiment.
Figure 2:
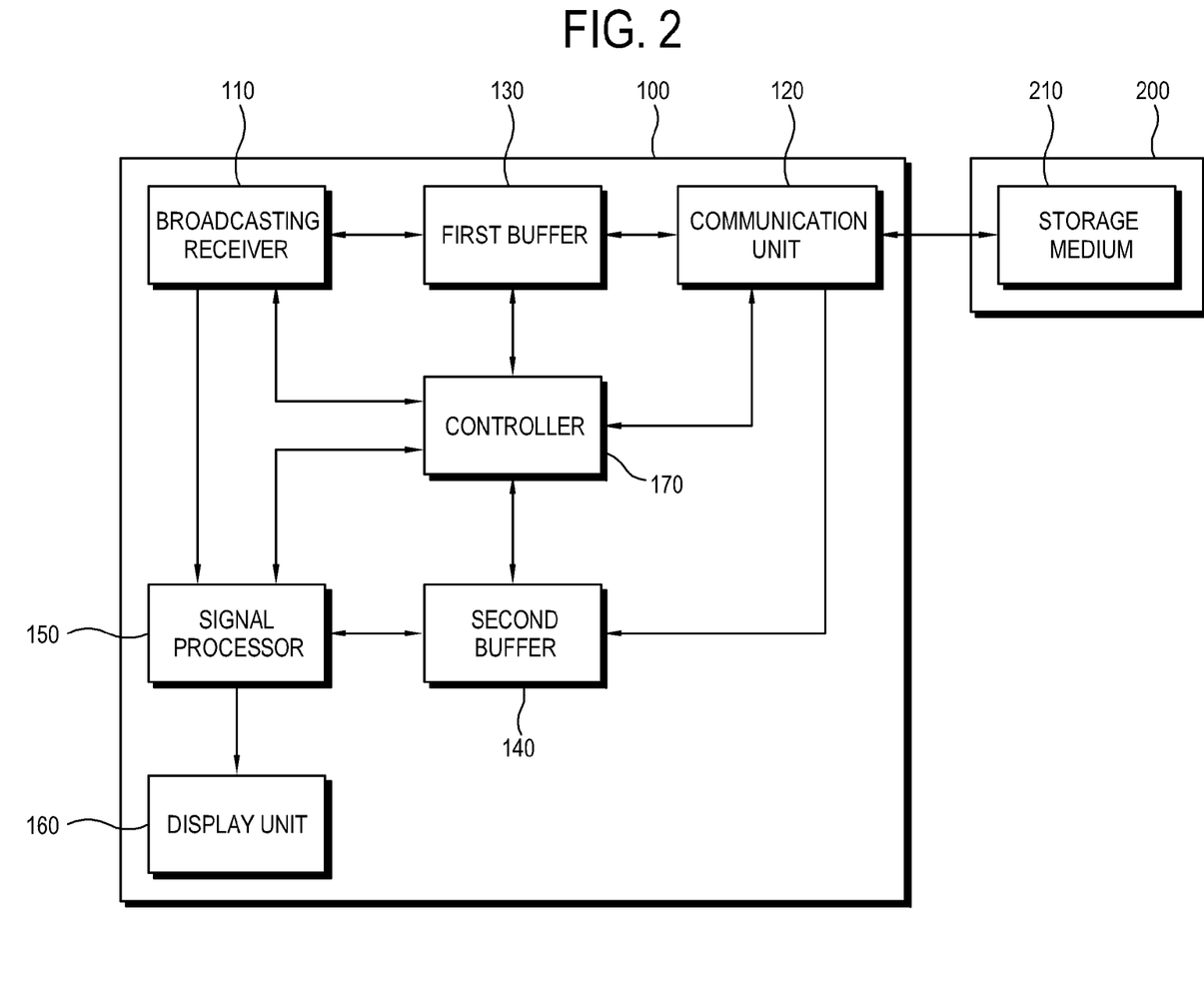
FIG. 2 is a control block diagram of the display apparatus in FIG. 1.

FIG. 1 illustrates a display apparatus and an external device according to an exemplary embodiment. FIG. 2 is a control block diagram of the display apparatus and the external device. As shown therein, the display apparatus 100 according to the exemplary embodiments includes a television, but is not limited thereto. Alternatively, the display apparatus 100 may further include a set-top box, a computer system, or other terminals which receive broadcasting signals. The display apparatus 100 communicates with the external device 200 to transmit and receive broadcasting signals including contents and various control signals.

According to the development of a digital type personal video recorder (PVR) which records information to a hard disk and plays information recorded in a hard disk instead of using a magnetic tape, a broadcasting recording and playing method which stores a received broadcasting signal and plays the stored broadcasting signal after a delayed time period or at specific time intervals, (a time shift function), is provided. As a networking function is added to the PVR, a technology which records and plays a broadcasting signal by using a storage device in a network has been developed.

The external device 200 includes a storage medium 210 (FIG. 2) which is provided to record a broadcasting signal received from the display apparatus 100. The external device 200 may include a computer system or a server which is connected to the display apparatus 100 in a network, but is not limited thereto. The external device 200 may store a broadcasting signal received from the display apparatus 100. The external device 200 may include a network attached storage (NAS) which belongs to a server.

As shown in FIG. 2, the display apparatus 100 includes a broadcasting receiver 110, a communication unit 120, a first buffer 130, a second buffer 140, a signal processor 150, a display unit 160 and a controller 170 which controls the foregoing elements.

The broadcasting receiver 110 tunes to a channel frequency according to a control of the controller 170 and receives a broadcasting signal from the concerned channel. The broadcasting receiver 110 includes a channel detection module (not shown) and an RF demodulation module (not shown).

The communication unit 120 transmits a broadcasting signal received from the broadcasting receiver 110 to the external device 200, and receives a broadcasting signal from the external device 200 according to a control of the controller 170. The communication unit 120 may include various wired and/or wireless communication interfaces without limitation to a certain interface. A bandwidth which is sufficient to allow communication between the display apparatus 100 and the external device 200 should be provided to stably store a broadcasting signal in the storage medium 210 of the external device 200 and to play the broadcasting signal by the display apparatus 100. The bandwidth means a frequency width of a channel held by the data, and is proportional to a data transmission volume. If the bandwidth is not sufficient, data flow is not smooth in a network, thereby reducing the data transmission volume. This results in the failure to record or play a broadcasting signal in a normal manner.

Figure 3:
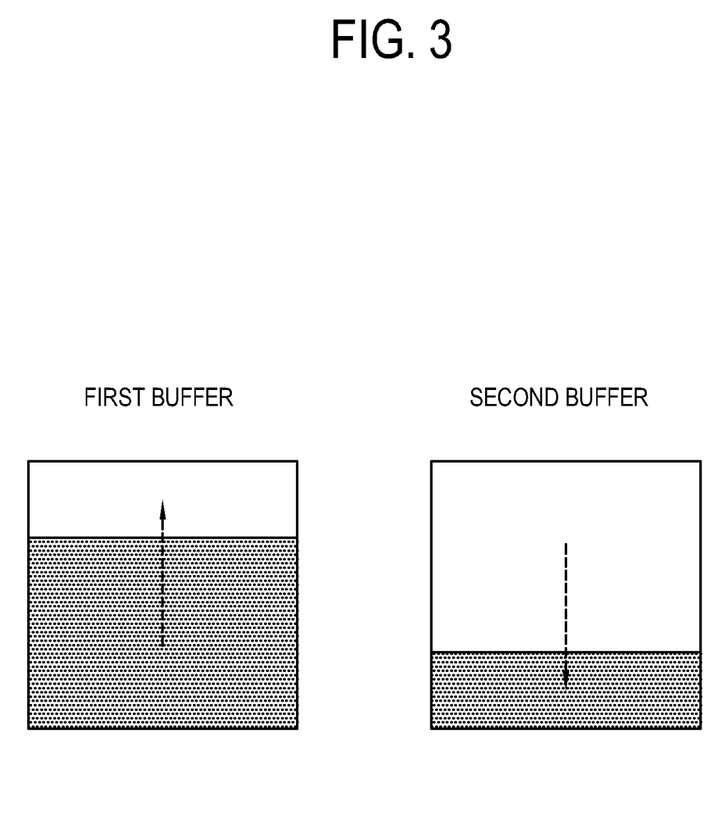
FIG. 3 illustrates a buffer of the display apparatus in FIG. 1.

The first buffer 130 is a storage which buffers a broadcasting signal to store the signal in the storage medium 210. The first buffer 130 is also named as a write buffer which is used to write a broadcasting signal in the storage medium 210. Typically, a transmission rate of an HD broadcasting signal may have a bit rate is 20 Mbit/s. That is, data are transmitted to the display apparatus 100 at approximately 20 Mbit per second. The broadcasting signal is buffered to the first buffer 130 at approximately 20 Mbit per second. A broadcasting signal of the first buffer 130 is transmitted to the external device 200 through the communication unit 120 and recorded in the storage medium 210. FIG. 3 illustrates buffers 130 and 140 according to the present exemplary embodiment. If there is a problem in communication between the display apparatus 100 and the external device 200 or if the data transmission volume increases abnormally, the broadcasting signal is not transmitted to the storage medium 210 but continues to be stored in the first buffer 130. If a bit rate of the broadcasting signal transmitted to the external device 200 from the display apparatus 100 is less than 20 Mbit, a buffer volume of the first buffer 130 increases. This means that there is a failure to record the broadcasting signal in a normal manner in the storage medium 210.

The second buffer 140 is a storage which buffers a broadcasting signal input from the external device 200 to play the broadcasting signal stored in the storage medium 210. The second buffer 140 may also be called a read buffer which is used to read a broadcasting signal from the storage medium 210. A broadcasting signal should be read at a certain rate and buffered to the second buffer 140 to play the broadcasting signal efficiently. As in FIG. 3, a decrease in the buffer volume of the second buffer 140 means that the broadcasting signal is not read normally, and that the broadcasting signal is not played in a normal manner.

The signal processor 150 processes a broadcasting signal received from the broadcasting receiver 110 to be displayed on the display unit 160, or plays a broadcasting signal of the second buffer 140 and displays the broadcasting signal on the display unit 160 upon execution of a broadcasting recording and playing function. The signal processor 150 includes a demultiplexer, a video decoder, an audio decoder, etc. (not shown).

The display unit 160 includes a display panel (not shown) displaying an image thereon and a panel driver (not shown) driving the display panel. The display panel may include a liquid crystal display (LCD) panel including liquid crystal, an organic light emitting diode (OLED) or a plasma display panel (PDP). If the display apparatus 100 according to the exemplary embodiment includes a set-top box, the display unit 160 may be omitted.

The controller 170 controls a broadcasting signal reception volume received from the external device 200 based on at least one buffer volume of the first and second buffers 130 and 140 upon execution of the broadcasting recording and playing function which stores a broadcasting signal in an external storage medium 210 and plays the stored broadcasting signal. In case of the broadcasting recording and playing, a broadcasting signal is transmitted to and received from the display apparatus 100 and the external device 200 at the same time to thereby increase a data transmission volume. If the bandwidth is not sufficient, a received broadcasting signal is not recorded. That is, a basic function of the PVR is not performed. Besides a user may not play a desired broadcasting signal. Thus, the controller 170 controls a broadcasting signal reception volume received from the external device 200 to thereby maintain a preset transmission volume transmitted to the external device 200, i.e., a transmission volume with which a normal recording is available. The controller 170 detects a buffer volume of the first and second buffers 130 and 140 to determine broadcasting signal transmission and reception volume, and outputs a control signal to the external device 200 to control the broadcasting signal reception volume based on the determination result. That is, the controller 170 controls the external device 200 to control the broadcasting signal reception volume while the external device 200 outputs to the display apparatus 100 a broadcasting signal whose reception volume has been changed according to a control signal of the controller 170.

The controller 170 may determine the broadcasting signal transmission volume based on a bit rate of a received broadcasting signal and a buffer volume of the first buffer 130. The bit rate of the broadcasting signal is included in header information of a broadcasting signal stream. The current broadcasting signal transmission volume may be determined by the bit rate of the broadcasting signal and the current buffer volume of the first buffer 130. The controller 170 determines whether the broadcasting signal transmission volume is less than the preset transmission volume, i.e., a transmission volume with which a normal recording is available. If the buffer volume of the first buffer 130 increases or the buffer volume of the second buffer 140 decreases as in FIG. 3, the broadcasting signal transmission volume is less than the preset transmission volume. Thus, the controller 170 outputs a control signal to the external device 200 to reduce the broadcasting signal reception volume if the buffer volume of the first buffer 130 increases. The controller 170 outputs the control signal to the external device 200 to increase the broadcasting signal reception volume if the buffer volume of the first buffer 130 decreases. Conversely, the controller 170 outputs a control signal to the external device 200 to increase the broadcasting signal reception volume if the buffer volume of the second buffer 140 increases. And the controller 170 outputs the control signal to the external device 200 to decrease the broadcasting signal reception volume if the buffer volume of the second buffer 140 decreases. That is, the controller 170 transmits the control signal to the external device 200 in inverse proportion to the buffer volume of the first buffer 130, and in proportion to the buffer volume of the second buffer 140.

The control signal may include information on the number of I frames of a broadcasting signal or include information on the broadcasting signal reception volume only.

Figure 4:
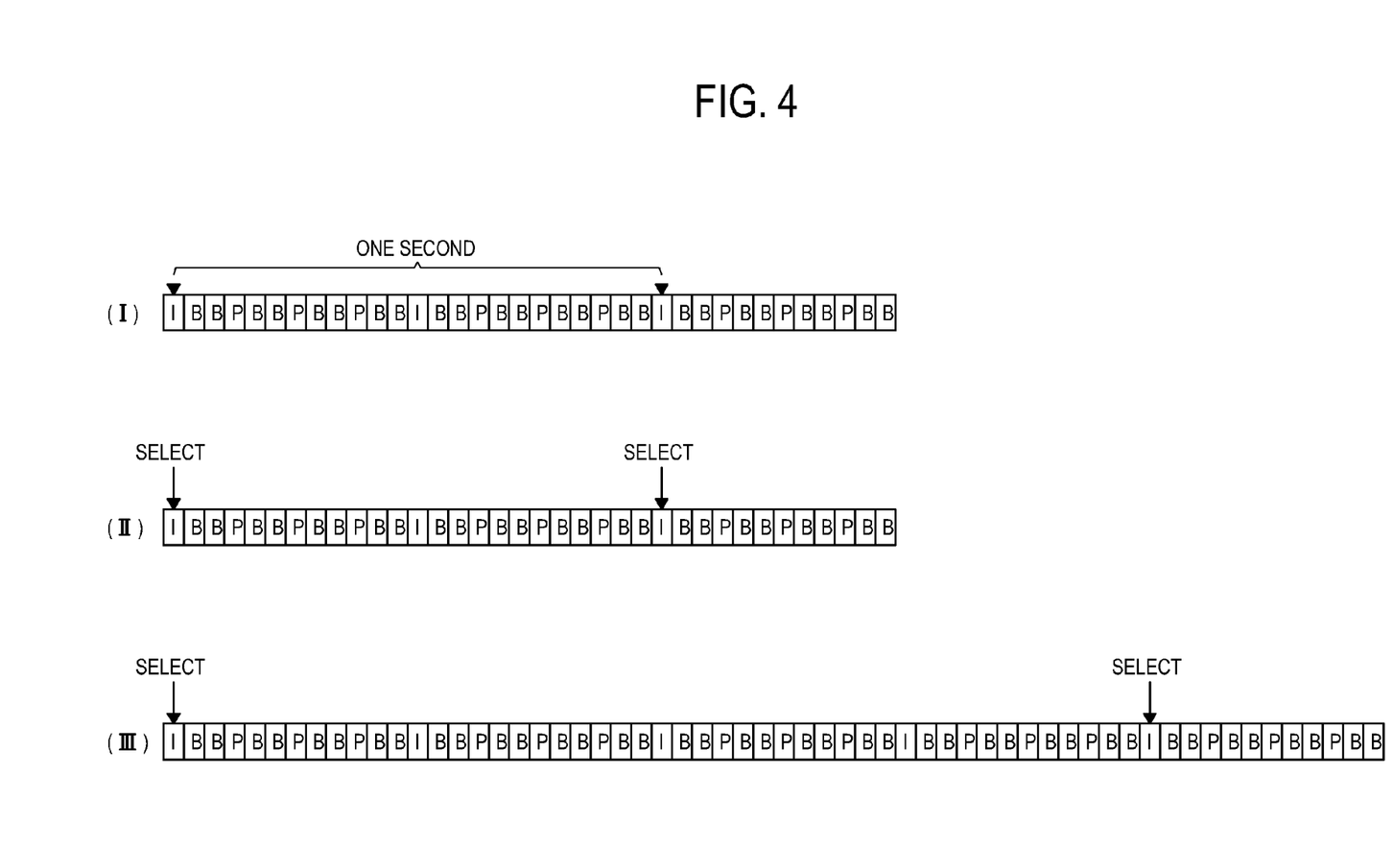
FIG. 4 illustrates an I frame which is input to the display apparatus in FIG. 1.

FIG. 4 illustrates an I frame which is input to the display apparatus 100 in FIG. 1. (I) illustrates frames which form a typical broadcasting stream. As shown therein, a broadcasting signal in an MPEG 2 format has a single I frame every 0.5 second. Thus, if a broadcasting signal is normally transmitted and received, two I frames are transmitted per second to the external device 200. If the broadcasting signal reception volume should decrease, the controller 170 adjusts the number of I frames input per second as one or half of one I frame rather than two I frames. (II) illustrates one I frame which is selected and received per second while (III) illustrates half of one I frame which is selected per second.

If a broadcasting signal is played at a faster speed by a user, the controller 170 outputs a control signal to the external device 200 to further decrease the number of I frames of a broadcasting signal received per second from the external device 200. In case of the playing at the faster speed, the number of selected frames per second is adjusted depending on the speed. Particularly, only the I frames may be selected and displayed. If the playing at the faster speed is selected for the broadcasting recording and playing, the number of I frames is less than that of the play at the normal speed.

If the buffer volume of the first buffer 130 does not decrease even though the smaller number of I frames of the broadcasting signal is received, the controller 170 may not receive the broadcasting signal to suspend playing the broadcasting signal. This is because the recording of the broadcasting signal received through the broadcasting receiver 110 takes precedence over the playing of the broadcasting signal. In this case, the display apparatus 100 may notify a user of a failure to receive the broadcasting signal from the external device 200 and thus the playing of the broadcasting signal is unavailable. The notification message may include a visual image message or an audio message such as beep sound.

If the number of the received I frames is less than the preset number, the controller 170 controls the signal processor 150 to repeatedly play the received I frames. A certain frame rate should be maintained for a user to view consecutive images without recognizing non-continuance of the video. Otherwise, a display quality of the image deteriorates and a user may not view a proper image. The preset number means the number of I frames by which the certain frame rate is maintained. If the broadcasting signal reception volume decreases and the number of I frames decreases, the signal processor 150 repeatedly plays the received I frames to maintain the frame rate. In this case, the display apparatus 100 may notify a user of a possibility that the broadcasting signal may not be played in a normal manner due to the transmission and reception of the broadcasting signal. The message may include a content that a future communication flow may be improved even though the current broadcasting signal is not played normally.

Figure 5:
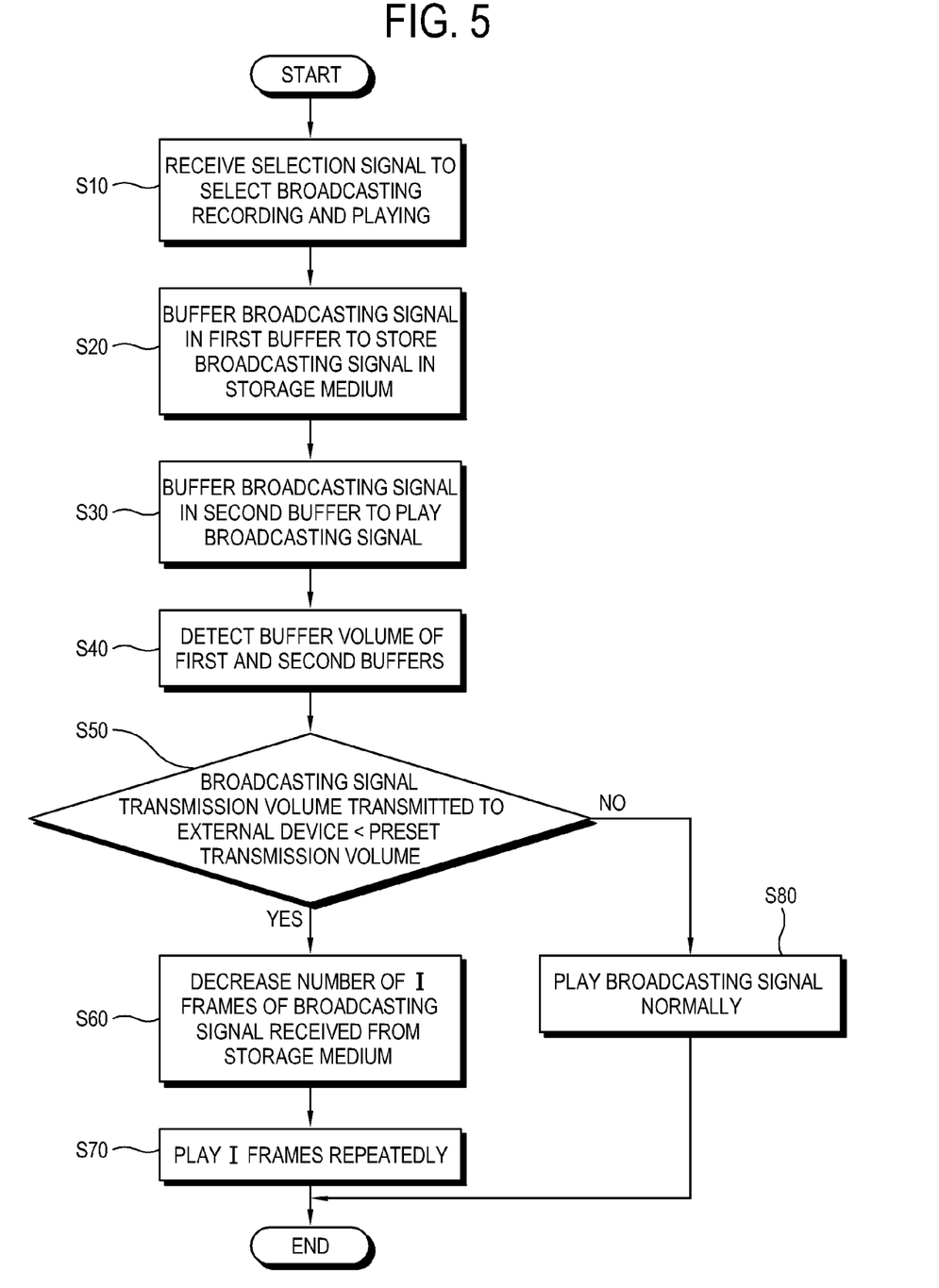
FIG. 5 is a control flowchart of an image playing method of the display apparatus in FIG. 1.

FIG. 5 is a control flowchart of an image playing method of the display apparatus 100 in FIG. 1. With reference to FIG. 5, the image playing method according to the present exemplary embodiment will be described as follows.

The display apparatus 100 receives a selection signal to select the broadcasting recording and playing (operation S10). A user may select the broadcasting recording and playing function through a user interface (not shown).

The controller 170 buffers the received broadcasting signal in the first buffer 130 and stores the broadcasting signal in the storage medium 210 of the external device 200 (operation S20).

The broadcasting signal stored in the storage medium 210 is buffered by the second buffer 140 to play a desired broadcasting signal (operation S30).

In case of the broadcasting recording and playing, the transmission and reception of the broadcasting signal is performed simultaneously and the data transmission and reception volume increases. If a data bandwidth is not sufficient due to the communication state, the recording or playing quality of the broadcasting signal may deteriorate.

The controller 170 detects the buffer volume of the first buffer 130 and second 140 (operation S40), and determines the broadcasting signal transmission volume based on the detected buffer volume.

The controller 170 compares the broadcasting signal transmission volume transmitted to the external device 200 and the preset transmission volume, and determines whether the broadcasting signal is normally recorded (operation S50).

If it is determined that the broadcasting signal transmission volume transmitted to the external device 200 is less than the preset transmission volume, the controller 170 decreases the number of I frames of the broadcasting signal received from the storage medium 210 to decrease the broadcasting signal reception volume (operation S60).

The signal processor 150 processes the broadcasting signal to output the broadcasting signal at the preset frame rate by repeatedly playing the received I frames as much as the decreased number of I frames (operation S70). Then, the broadcasting recording and playing function may be performed, maintaining the recording quality of the broadcasting signal. The information on the repeated playing of the I frames may be transmitted to the display apparatus 100 by the external device 200 or the controller 170 may determine the number of times the I frames are repeatedly played based on the received I frames.

The controller 170 continues to detect the buffer volume of the first and second buffers 130 and 140. If the controller 170 detects that the buffer volume of the first buffer 130 decreases or the buffer volume of the second buffer 140 increases after decreasing the number of I frames, it determines that the data communication is smooth and increases the broadcasting signal reception volume.

If it is determined that the broadcasting signal transmission volume transmitted to the external device 200 is higher than the preset transmission volume, the controller 170 determines that the recording and playing of the broadcasting signal is normal and plays the broadcasting signal normally (operation S80).

Figure 6:
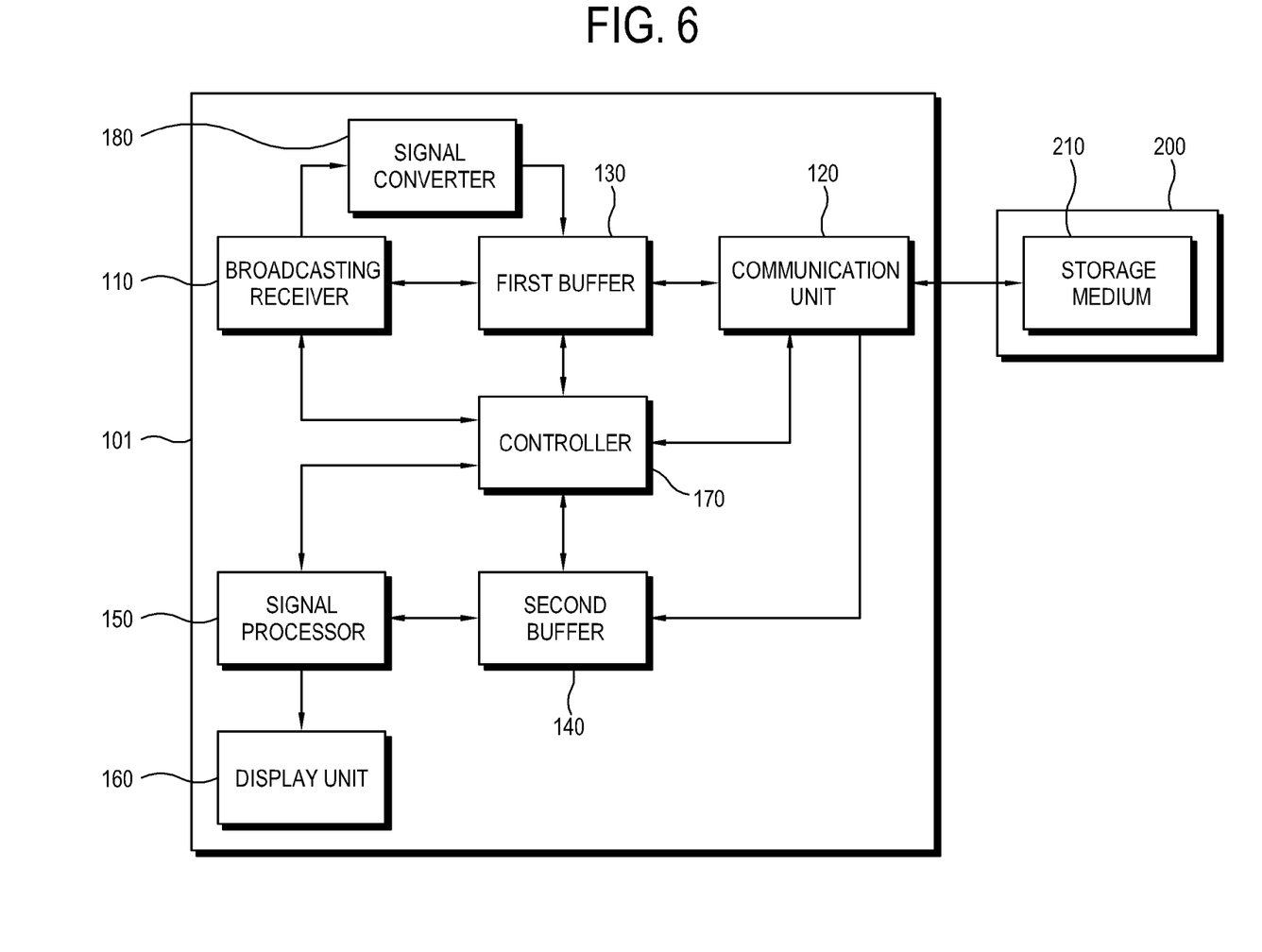
FIG. 6 is a control block diagram of a display apparatus according to another exemplary embodiment.

FIG. 6 is a control block diagram of a display apparatus according to another exemplary embodiment. A display apparatus 101 further includes a signal converter 180.

The signal converter 180 is a transcoder which changes a resolution of an image signal, and decreases the resolution of the broadcasting signal according to the present exemplary embodiment. If the buffer volume of the first buffer 130 continues to increase even though the broadcasting signal reception volume decreases, the controller 170 decreases the resolution of the broadcasting signal and reduces the data transmission volume. For example, if the broadcasting signal includes an HD image signal, it may be transcoded to an SD image signal. If the buffer volume of the first buffer 130 exceeds a critical value, the controller 170 controls the broadcasting receiver 110 and the signal converter 180 to input the broadcasting signal to the first buffer 130 through the signal converter 180.

According to another exemplary embodiment, the signal converter 180 may change a compression rate of a broadcasting signal, and may change received broadcasting signals into signals at different compression rates. That is, the signal converter 180 may raise the compression rate of the broadcasting signal to decrease the data buffered to the first buffer 130. For example, if a broadcasting signal in an MPEG 2 format is received, the signal converter 180 may change the broadcasting signal into a broadcasting signal in an MPEG 4 format which is higher than the MPEG 2 format in the compression rate. Even in the case of a broadcasting signal in the same the MPEG 2 format, the signal converter 180 may raise the compression rate. If a H.264 signal in an MPEG 4 format is received, the signal converter 180 may change the signal into a signal in a different profile whose compression rate is higher.

If the format of the received broadcasting signal is changed and the compression rate is raised or the resolution of the broadcasting signal is changed, the display apparatus 101 *t* may notify a user of the information above.

The exemplary embodiment provides a display apparatus and an image playing method thereof which plays a broadcasting signal while maintaining a recording quality of the broadcasting signal if the recording and playing of the broadcasting signal is performed through a network to implement a time shift function.

As described above, a display apparatus and an image playing method thereof according to the exemplary embodiment plays an image while maintaining a recording quality.

Also, the display apparatus and the image playing method thereof according to the exemplary embodiment determines a data transmission volume by detecting a buffer volume of a buffer.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. A display apparatus, comprising:
a broadcasting receiver which receives a broadcasting signal;
a communication unit which communicates with an external device comprising a storage medium;

a first buffer which buffers the broadcasting signal, which is transmitted to the external device, to store the received broadcasting signal in the storage medium;

a second buffer which buffers the broadcasting signal received from the external device to play the broadcasting signal stored in the storage medium; and a controller which detects both a buffered data volume in the first buffer and a buffered data volume in the second buffer, and outputs a control signal to the external device to control an output rate of the broadcasting signal of the external device based on at least one of the detected buffered data volume in the first buffer and the detected buffered data volume in the second buffer when a broadcasting recording and playing function which stores the broadcasting signal in the storage medium and plays the stored broadcasting signal, is executed, wherein the external device is external to the display apparatus.

2. The display apparatus according to claim 1, wherein the controller outputs a control signal to the external device to make a broadcasting signal transmission volume transmitted to the external device correspond to a preset transmission volume.

3. The display apparatus according to claim 2, wherein the controller determines the broadcasting signal transmission volume based on a bit rate of the received broadcasting signal and the buffered data volume of the first buffer.

4. The display apparatus according to claim 1, wherein the controller outputs a control signal to the external device to control a broadcasting signal reception volume in inverse proportion to the buffered data volume of the first buffer.

5. The display apparatus according to claim 1, wherein the controller outputs a control signal to the external device to control a broadcasting signal reception volume in direct proportion to the buffered data volume of the second buffer.

6. The display apparatus according to claim 1, wherein the controller outputs a control signal to the external device to adjust the number of I frames of the broadcasting signal received per second from the external device.

7. The display apparatus according to claim 6, wherein the broadcasting signal is played at a first speed and the controller outputs a control signal to the external device to reduce the number of I frames of the broadcasting signal received per second from the external device if the broadcasting signal is to be played at a second speed that is greater than the first speed.

8. The display apparatus according to claim 7, further comprising a signal processor which plays the broadcasting signal received from the external device, wherein the controller controls the signal processor to repeatedly play the received I frames if the number of I frames received per second is less than a preset number.

9. The display apparatus according to claim 1, further comprising a signal converter which converts at least one of a resolution and a compression rate of an image signal, wherein the controller controls the signal converter to decrease a resolution or increase a compression rate of the broadcasting signal received from the broadcasting receiver if the buffer volume of the first buffer exceeds a predetermined value, and buffers the broadcasting signal whose resolution decreases or compression rate increases in the first buffer.

10. The display apparatus according to claim 9, wherein the broadcasting signal is changed from a high definition (HD) signal into a standard definition (SD) signal.

11. The display apparatus according to claim 9, wherein if the broadcasting signal is an MPEG 2 format, the compression rate of the broadcasting signal is changed according to the MPEG 4 format.

12. An image playing method of a display apparatus which communicates with an external device including a storage medium, the method comprising:

receiving a selection signal to select a broadcasting recording and playing function which stores a received broadcasting signal in the storage medium and plays the stored broadcasting signal;

buffering the broadcasting signal, which is transmitted to the external device, in the first buffer to store the broadcasting signal in the storage medium;

buffering the broadcasting signal received from the external device by a second buffer to play the broadcasting signal stored in the storage medium;

detecting both a buffer data volume in the first buffer and a buffer data volume in the second buffer; and outputting a control signal to the external device to control an output rate of the broadcasting signal of the external device based on at least one of the detected buffer data volume in the first buffer and the detected buffer data volume in the second buffer, wherein the external device is external to the display apparatus.

13. The method according to claim 12, wherein the outputting the control signal to the external device comprises outputting a control signal to control the broadcasting signal reception volume to make a broadcasting signal transmission volume transmitted to the external device correspond to a preset transmission volume.

14. The method according to claim 13, further comprising determining the broadcasting signal transmission volume based on a bit rate of the received broadcasting signal and the buffered data volume of the first buffer.

15. The method according to claim 12, wherein the outputting the control signal to the external device comprises outputting a control signal to reduce a broadcasting signal reception volume if the buffered data volume of the first buffer increases.

16. The method according to claim 12, wherein the outputting the control signal to the external device comprises outputting a control signal to reduce a broadcasting signal reception volume if the buffered data volume of the second buffer decreases.

17. The method according to claim 12, wherein the outputting the control signal to the external device comprises outputting a control signal to adjust the number of I frames of the broadcasting signal received from the external device.

18. The method according to claim 17, wherein the broadcasting signal is played at a first speed and if the broadcasting signal is to be played at a second speed that is greater than the first speed, the number of I frames of the broadcasting signal received from the external device decreases.

19. The method according to claim 18, further comprising playing broadcasting signal received from the external device, wherein the playing the broadcasting signal comprises playing the received I frames repeatedly if the number of I frames of the broadcasting signal received per second from the external device is less than the preset number.

20. The method according to claim 12, further comprising decreasing a resolution or increasing a compression rate of broadcasting signal received from a broadcasting receiver if the buffered data volume of the first buffer exceeds a predetermined value.

21. The method according to claim 20, wherein the broadcasting signal is changed from a high definition (HD) signal into a standard definition (SD) signal.

22. The method according to claim 20, wherein if the broadcasting signal is a broadcasting signal in an MPEG 2 format, the compression rate of the broadcasting signal is changed according to the MPEG 4 format.

23. A method for playing an image in a display apparatus, comprising: receiving a broadcasting signal; receiving a selection signal to select one of a broadcasting recording function or broadcasting playing function; buffering the broadcasting signal, which is transmitted to the external device, in a first buffer to store the broadcasting signal in a storage medium in an external device; buffering the broadcasting signal received from the external device in a second buffer to play the broadcasting signal stored in the storage medium; detecting both a buffer data volume in the first buffer and a buffer data volume in the second buffer, and controlling an output rate of the broadcasting signal of the external device based on at least one of the detected buffer data volume in the first buffer and the detected buffer data volume in the second buffer, wherein the external device is external to the display apparatus.

24. The method of claim 23, wherein if the buffer volume of the first buffer increases and the broadcasting signal reception volume decreases, a resolution of the broadcasting signal is decreased and a data transmission volume is reduced.

25. The method of claim 23, wherein a resolution of the broadcasting signal is decreased or a compression rate of the broadcasting signal is increased if the buffered data volume of the first buffer exceeds a predetermined value.

26. The method of claim 25, wherein the predetermined value is a preset transmission volume.

* * * * *